United States Patent [19]

Overman

[11] Patent Number: 4,459,459
[45] Date of Patent: Jul. 10, 1984

[54] POWER SUPPLY FOR ELECTRIC ARC WELDING

[75] Inventor: John A. Overman, Riverside, Ill.

[73] Assignee: Airco, Inc., Montvale, N.J.

[21] Appl. No.: 300,352

[22] Filed: Sep. 8, 1981

Related U.S. Application Data

[63] Continuation-in-part of Ser. No. 249,751, Apr. 1, 1981, abandoned.

[51] Int. Cl.³ .............................................. B23K 9/09
[52] U.S. Cl. ........................... 219/130.51; 219/130.32
[58] Field of Search .................... 219/130.51, 130.32, 219/130.1

[56] References Cited

U.S. PATENT DOCUMENTS

| | | | |
|---|---|---|---|
| 3,330,933 | 7/1967 | Maklary | 219/131 |
| 3,382,345 | 5/1968 | Normando | 219/137 |
| 3,530,359 | 9/1970 | Grist | 219/130.32 |
| 3,598,954 | 8/1971 | Iceland | 219/131 R |
| 3,746,965 | 7/1973 | Okada et al. | 219/130.32 |
| 3,894,210 | 7/1975 | Smith et al. | 219/131 R |
| 3,904,846 | 9/1975 | Risberg | 219/135 |
| 3,999,034 | 12/1976 | Barhorst | 219/131 R |
| 4,038,515 | 7/1977 | Risberg | 219/131 R |
| 4,092,517 | 5/1978 | Woodacre | 219/137 PS |
| 4,310,744 | 1/1982 | Okada | 219/130.51 |

FOREIGN PATENT DOCUMENTS 52-35139  3/1977  Japan ............................. 219/130.51

Primary Examiner—C. C. Shaw
Attorney, Agent, or Firm—David A. Draegert; Larry R. Cassett

[57] ABSTRACT

A power supply for electric arc welding, particularly gas tungsten arc welding, is described. The supply operates from conventional, alternating potential, and provides either a direct current or an alternating current with a rectangular wave shape to a load. The supply includes an input transformer, and two current paths, each of which includes an inductor and a controlled rectifier. A control circuit initiates conduction of the rectifiers at appropriate times selected to obtain the desired load current. In preferred embodiments, the control circuit includes differential amplifiers which enable comparison of the output current to a control current, adjustment of the ratio of the currents in the two current paths, and adjustment of the gain and time constant of the control circuit.

14 Claims, 5 Drawing Figures

POWER SUPPLY FOR ELECTRIC ARC WELDING

This application is a continuation-in-part of U.S. Ser. No. 249,751, filed Apr. 1, 1981 now abandoned.

BACKGROUND OF THE INVENTION

1. Field of the Invention

The invention relates to electric arc welding and particularly to a power supply for gas tungsten arc welding.

2. Description of the Prior Art

Gas tungsten arc welding (GTAW), or tungsten inert gas (TIG) welding, is a well-known process in which a current flows between a non-consumable welding electrode, usually tungsten, and a workpiece, typically aluminum. GTAW operations with alternating current and direct current with the electrode negative (so-called straight polarity) or positive (so-called reverse polarity) are familiar to individuals skilled in the welding art. Similarly, welding processes using pulsed power and using supplemental radio-frequency power to provide better arc ignition or arc stabilization are well known.

Several factors influence the selection of the current wave shape for alternating current GTAW. Welding occurs primarily when the electrode is negative, but the electrode is made positive periodically to clean it. Because the electron emissivity of aluminum is much lower than that of tungsten, a higher potential must be applied to establish an arc when the electrode is positive, but too high a positive potential leads to migration of tungsten from the electrode. The positive potential should have a flat top in order to reduce overheating and possible melting of the tungsten electrode. The transition between negative and positive polarity must be accomplished quickly in order to reignite the arc and minimize rectification in the arc. Experience has shown that the optimum current wave shape is an asymmetric square wave, or rectangular wave. Preferably, both the magnitude and duration of the positive and negative current portions are adjustable to optimize the workpiece heating, electrode cleaning and other parameters for a particular welding situation.

Magnetic amplifiers or saturable reactors have been used for inexpensive power supplies for GTAW. Two independent direct current supplies with an associated switching network are more expensive but provide better control of wave shape. Such power supplies are described in U.S. Pat. Nos. 3,330,933 to Maklary, 3,999,034 to Barhorst, and 3,904,846 to Risberg (FIG. 2E). U.S. Pat. Nos. 3,382,345 to Normando, 3,598,954 to Iceland, 3,894,210 to Smith et al, 3,904,846 to Risberg (FIG. 2B), and 4,092,517 to Woodacre disclose welding power supplies having a single direct current source coupled with an inverter to provide an alternating current output. Some of the power circuits of the preceding Risberg and Normando patents employ a center-tapped inductor to commutate silicon controlled rectifiers. The circuit of U.S. Pat. No. 4,038,515, also to Risberg, combines an input transformer, a single inductor and a bridge of four silicon controlled rectifiers which are fired at selected times synchronized with the input potential. In most of the circuits in the two patents to Risberg, a controlled rectifier provides a free wheeling path for inductor current during a portion of the cycle.

SUMMARY OF THE INVENTION

The present invention is a welding power supply which is suitable for GTAW. The supply operates from a source of conventional alternating potential and includes an input transformer and two current paths, each of which includes an inductor and a controlled rectifier. The two inductors are magnetically tightly coupled, preferably by winding them on the same iron core. A conduction control circuit initiates conduction of the two controlled rectifiers at appropriate times; one at a selected phase of the positive half-cycle of the input potential and the other at a selected phase of the negative half-cycle. In a preferred circuit, the two current paths are connected to provide either a direct current or a rectangular wave current which is adjustable over a wide range.

Preferably, the conduction control circuit includes a differential amplifier for comparing the load current with a desired control current and a capacitor for integrating the output of the differential amplifier over the conduction interval of the corresponding controlled rectifier. Also preferably, the conduction control circuit includes variable feedback elements for decreasing the gain and for increasing the response time of the differential amplifier as the load current increases.

The power supply of the invention is light weight and relatively inexpensive because it requires a minimum number of controlled rectifiers and inductors in the power circuit. In particular, the circuit does not require a diode to provide a free wheeling path for an inductor current.

DESCRIPTION OF THE PREFERRED EMBODIMENTS

Figure 1:
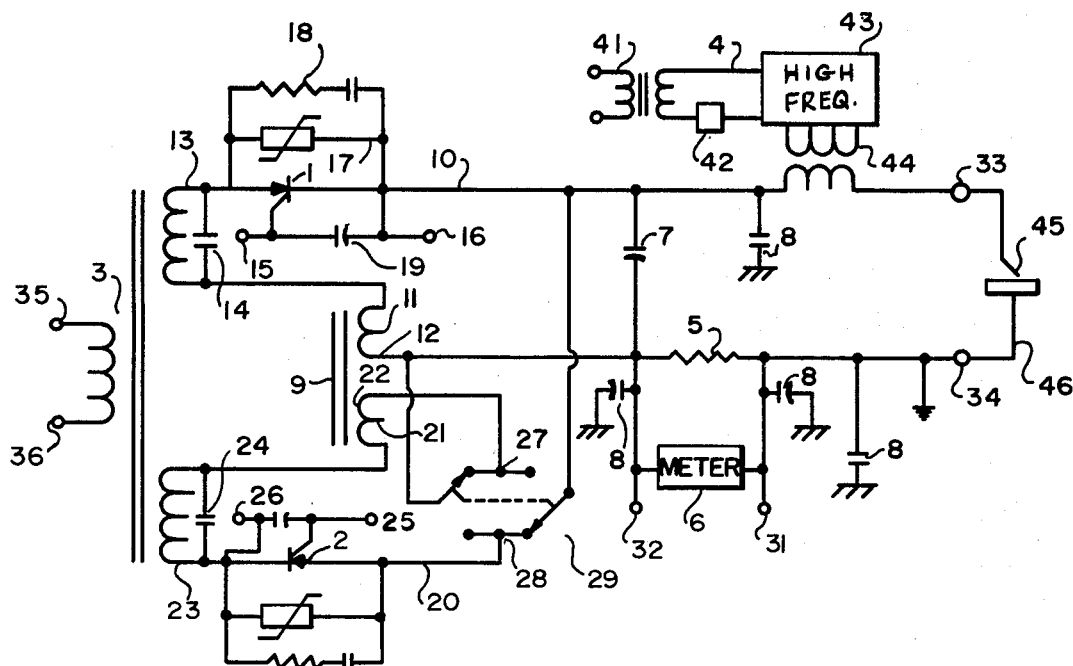
FIG. 1 is a schematic diagram of a power circuit of a welding power supply according to the present invention.

The welding power supply of FIG. 1 is designed to be powered by a sinusoidal potential applied to the primary windings 35 and 36 of an input transformer 3. The output of the power supply at terminals 33 and 34 is either a direct current or an alternating current with a rectangular wave synchronized with the input potential. The intended load is an electric arc between a welding electrode 45 and a workpiece 46.

The power supply of FIG. 1 has two controlled rectifiers 1 and 2, each of which may be a silicon controlled rectifier (SCR). Each SCR is part of a current path connected to the load. In the first current path 10, one end of a first inductor 11 is connected to a first secondary winding 13 of the input transformer 3. This winding is also connected to the anode of SCR 1. The cathode of SCR 1 is connected to one output terminal 33. The other output terminal 34 is connected to the other end 12 of the first inductor 11.

In the second current path 20, one end of a second inductor 21 is connected to a second secondary winding 23 of the input transformer 3. This winding is also connected to the cathode of SCR 2. The anode of SCR 2 and the other end 22 of the second inductor 21 are connected to opposite pairs of terminals 27, 28 of a double-pole double-throw switch 29. In the switch position shown in FIG. 1, the end 22 of the second inductor 21 is connected to one output terminal 34, and the anode of the SCR 2 is connected to the other output terminal 33. Thus, if the two SCR's are fired on alternate half-cycles of the input potential, the load current alternates in direction. In the second switch position, the output terminal connections of the anode of SCR 2 and the end 22 of the second inductor 21 inductor are reversed, and, if the two SCR's are fired on alternate half-cycles, the load current is always in the same direction with the terminal 33 positive and terminal 34 negative. A more complex switch is easily provided which also allows a direct-current output but with reversed polarities of the output terminals 33 and 34.

The two inductors 11 and 21 are connected in such a way that the magnetic flux induced by a current in the first path 10 adds to the magnetic flux induced by a current in the second path 20. Preferably, the inductors are closely wound on the same iron core 9. Because of the tight magnetic coupling, the current shifts from one inductor to the other very rapidly when there is a change in the polarity of the potential applied to the inductors. When connected to provide an alternating current output, the two inductors function as a center-tapped choke and their inductances cause the output current wave form to be a rectangular wave with a short rise time.

In a specific embodiment designed for a 60 Hz, single-phase, input potential of 230 V, and a maximum output of 80 V and 300 A, the transformer primary has 46 turns, each secondary has 16 turns, and each inductor has 90 turns and an inductance of 8.4 mH. Each SCR is a conventional phase control device capable of 300 A average current and 600 V peak inverse potential.

The specific embodiment also includes two 40 μF capacitors 14 and 24, one connected across each secondary winding of the input transformer 3. The capacitors "stiffen" the transformer response, aid in commutating the two SCR's and help prevent rectification in the welding arc. Also included are a low resistance shunt 5 in series with load current, and a meter 6 across the terminals 31 and 32 of the shunt. A shunt which provides 50 mV for a 400 A load current is suitable.

The power supply may include a high-frequency circuit 4 which comprises a power transformer 41, a control network 42 and a radio frequency oscillator 43 which is coupled to the load current circuit at terminal 33 by a coupling transformer 44.

The preferred power supply also includes conventional devices for protecting the controlled rectifiers and other elements from stray high-frequency signals and other transients. For SCR 1, these protective devices include: a varistor 17, and a series combination 18 of a resistor and a capacitor, connected between the anode and the cathode; and a capacitor 19 connected between the gate and the cathode. The preferred power supply also includes a capacitor 7 connected across the secondary of the high-frequency transformer 44, the load and the shunt 5, as well as capacitors 8 connected from various points to chassis ground in order to eliminate stray high-frequency signals.

Figure 2:
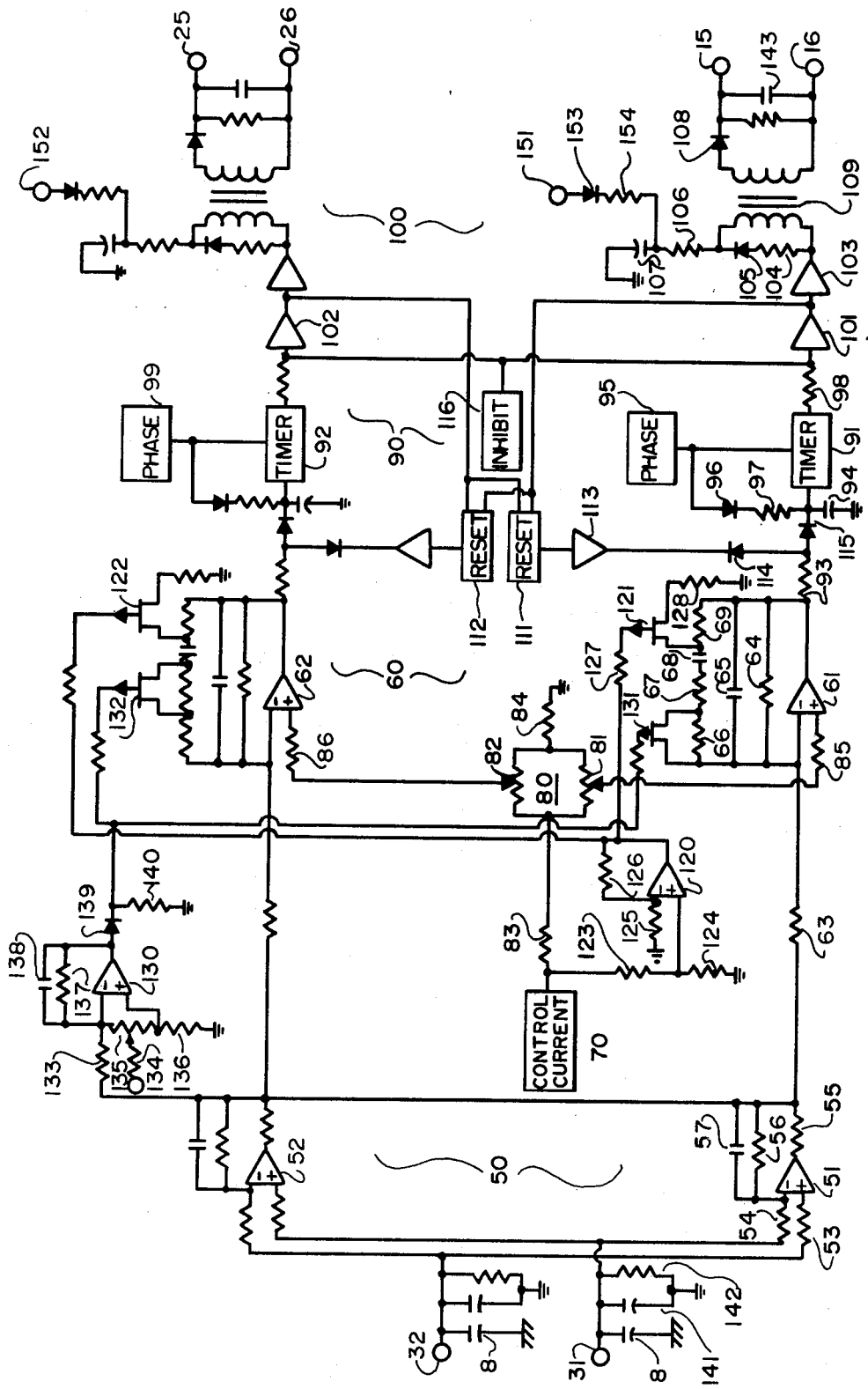
FIG. 2 is a schematic diagram of a conduction control circuit for the power supply of FIG. 1.

The firing of the SCR's is controlled by a conduction control circuit, such as shown in FIG. 2. This circuit provides pulses of the proper phase and polarity to the gate terminals 15 and 25 of the controlled rectifiers 1 and 2 to enable them to conduct during appropriate intervals and obtain a selected output current. The preferred circuit comprises an input stage 50, a comparator stage 60, a timer stage 90, and a driver stage 100. The stages are all powered by a conventional 12 V dc power supply and protected by various diodes and other elements which are omitted from FIG. 2 for clarity.

The input stage 50 has two differential amplifiers 51 and 52. Amplifier 51 has input resistors 142, 53 and 54, an output resistor 55, and feedback elements such as a resistor 56 and a capacitor 57. Amplifier 52 has similar elements associated with it. The positive and negative inputs of the two differential amplifiers are connected in reverse parallel across the terminals 31 and 32 of the shunt 5 which carries the load current of the power supply. If terminal 32 is positive relative to terminal 31, the first input amplifier 51 is active and the second amplifier 52 is inactive. If the terminal 32 is relatively negative, the first input amplifier 51 is inactive and the second is active. The outputs of the two differential amplifiers 51 and 52 are connected in parallel, and they form an absolute value amplifier which provides a positive signal to the following stages in all cases, whether the load current is alternating, or direct of either polarity.

Each of the subsequent stages also has two sections which are basically alike. The first section of each stage serves to fire SCR 1 during the positive half-cycle of the input potential; the second section fires SCR 2 during the negative half-cycle. The structure of only the first section of each stage will be discussed in detail.

The comparator stage 60 includes two differential amplifiers 61 and 62 which compare the signal derived from the load current to a reference signal. The firing of SCR 1 and SCR 2 and, thus, the load current are altered in response. The signal derived from the load current is applied to the negative input of amplifier 61 through a 4.7 kΩ resistor 63 connected to the output of the input stage 50 and similarly for amplifier 62.

Figure 3:
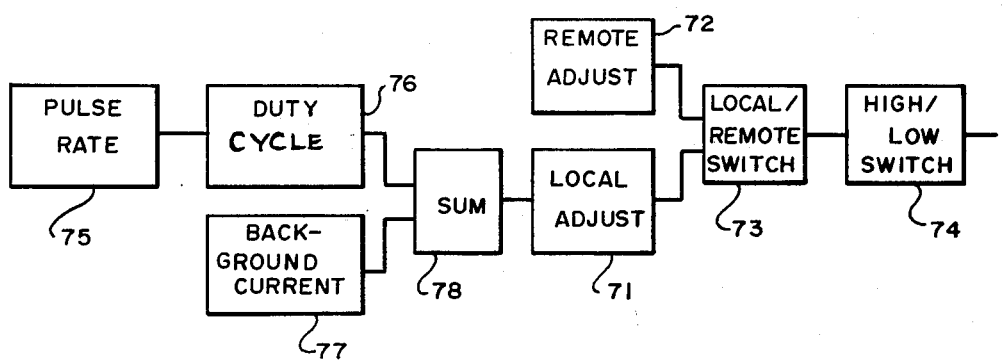
FIG. 3 is a block diagram of a source of control current for the conduction control circuit of FIG. 2.

The reference signal for each comparator amplifier is derived from a control current source 70. The control current is a relatively low level direct current which may be held constant or varied as desired so as to adjust the magnitude of the load current between zero and the maximum output. The specific variation of the control current and the means for generating it are not particularly important to the present invention. As indicated in FIG. 3, the control current may be determined by a local adjustment 71 internal to the power supply or by a remote adjustment 72 located some distance away for the convenience of the welder. The source, either local or remote, and the magnitude range, either high or low, are selected by switches 73 and 74, respectively. If pulsed power welding is desired, networks to select a suitable pulse rate 75, duty cycle 76 and background current 77 are used with a summing network 78 to generate a pulsed current which modifies the peak current selected by the local current adjustment 71.

The control current, however generated, appears on a reference ratio network 80 which is a voltage divider comprising two potentiometers 81 and 82, connected in parallel, and two series resistors 83 and 84. The first potentiometer 81 is a trim control which provides a desired fraction of the control current to the first comparator amplifier 61 through the resistor 85. Potentiometer 82 is a balance control which provides a desired fraction of the control current to the second comparator amplifier 62 through a resistor 86. The operation of this network is discussed in more detail in a following paragraph.

The first comparator amplifier 61 has feedback elements which include a 680 kΩ resistor 64, a parallel 0.01 μF capacitor 65, and a variable feedback network comprising a series combination of two 15 kΩ resistors 66 and 67, a 2 μF capacitor 68, and a 10 kΩ resistor 69. This network is part of an active filter which enables changing the gain and the response time of the first comparator amplifier. Similar feedback elements are provided for the second comparator amplifier 62.

Because of the non-linear reactance of the inductors 11 and 21 at low load currents, the ac gain of the comparator amplifiers 61 and 62 is preferably increased for load currents less than a threshold of about 20 amps. This alteration is accomplished by switching off FET 131 which parallels feedback resistor 66 of comparator amplifier 61 and FET 132 which parallels the similar feedback resistor of comparator amplifier 62. The negative input of an operational amplifier 130 is connected to the output of the input stage 50 by a resistor 133; the positive input is connected to ground through resistor 136. A 12 V dc potential is applied, via terminal 37 and resistor 134, to the wiper of a potentiometer 135 connected across the inputs of the amplifier 130. Feedback resistor 137, feedback capacitor 138 and the anode of a diode 139 are connected to the output of amplifier 130. The cathode of diode 139 is connected to a grounded resistor 140 and to the gates of FET 131 and FET 132. Potentiometer 135 provides an adjustable threshold below which the gates of FET's 131 and 132 are high, and above which they are low. Thus, the ac gain of comparator amplifier 61 is higher below the threshold than above the threshold where FET 131 is a current bypass to resistor 66.

In their linear reactance range, the time required for inductors 11 and 21 to respond to a change in the magnitude of the load current increases with the magnitude of the current. For an 80 V potential and an inductance of 8.4 mH, the response time increases at a rate of about 0.1 msec/A. In order to have stable arc characteristics, the response time of the conduction control circuit must also be increased.

The response time of the conduction control circuit of FIG. 2 is increased by increasing the time constant of the variable feedback network. The control current is monitored by a voltage divider, resistors 123 and 124, and an operational amplifier 120 connected to the control current source 70. A grounded resistor 125 and a feedback resistor 126 are connected to the negative input of amplifier 120. The output of amplifier 120 is connected through resistors, such as 127, to the gates of FET 121 and FET 122 connected to the feedback elements of amplifiers 61 and 62, respectively. When the control current increases, the potential on the gate of FET 121 increases, thus decreasing the current in FET 121 and a 470 Ω resistor 128 and increasing the effectiveness of capacitor 68. Thus, the time constant of the comparator amplifier 61 increases as the control current increases.

An integrating network, part of the timer stage 90, follows each comparator amplifier. The first integrating network includes a 93 kΩ resistor 93 and a 0.1 μF capacitor 94. Proper phasing of the firing pulses for SCR 1 is obtained by a zero-crossing circuit 95 which provides a constant positive signal during the positive half-cycle (phase 0° to 180°) of the input potential and a ground signal during the negative half-cycle (phase 180° to 360°). This circuit 95 is connected by a diode 96 and a resistor 97 to the integrating capacitor 94. A timer 91, such as a National Semiconductor Corp. LM555J timer, senses the potential on the capacitor 94. When the capacitor potential reaches a trigger level, the timer 91 supplies a pulse through resistor 98 to a first driver amplifier 101. Proper phasing of SCR 2 is obtained by a second zero-crossing circuit 99, whose output is at ground for phase 0° to 180° and positive otherwise, a second timer 92, and a second driver amplifier 102.

The first section of the driver stage 100 includes two amplifiers 101 and 103 which are followed by a series network to ground. The series network includes a resistor 104, a diode 105, a resistor 106 and a capacitor 107. The ungrounded side of capacitor 107 is also connected to a resistor 154 and a capacitor 153 which form a half-wave rectifier powered by the input potential, transformed to 24 V, connected across terminals 151 and 152. The primary winding of an isolation transformer 109 is connected across the resistor 104 and diode 105, and a second diode 108 and resistor 110 are connected across the secondary of the isolation transformer. The gate 15 and the cathode 16 terminals of the SCR 1 are connected across the resistor 110 and a parallel protective capacitor 143. Similarly, the gate 25 and cathode 26 terminals of SCR 2 are connected to the second section of driver stage 100.

The output of the driver amplifier 103 is at a positive potential when SCR 1 is not conducting. When the timer 91 delivers a pulse during a positive half-cycle of the input potential, the output of the driver amplifier 103 goes negative. The energy stored in capacitor 107 during the previous half-cycle now causes a pulse of current through the pulse transformer 109. The preferred driver stage provides a consistent pulse to the controlled rectifier regardless of the phase of the firing point. Further, this driver stage requires only a small transformer 109 since it passes only a pulse.

The timing of the firing of the controlled rectifiers is determined by ramp and pedestal potentials stored in the integrating capacitors. The comparator amplifiers provide the pedestal and the phase circuits provide the ramp. If SCR 1 is conducting, the output of the first comparator amplifier 61 is accumulated in integrating capacitor 94 until the SCR 1 is turned off by the firing of the SCR 2 during a negative half-cycle of the input potential. A diode 115 prevents the potential on the capacitor 94 from decreasing so the pedestal level is stored. When the input potential again becomes positive, the positive signal from the phase circuit 95 is conducted through diode 96 and resistor 97 into the integrating capacitor 94. The potential on the capacitor increases until it reaches the level which triggers the timer circuit 91. When triggered, the timer circuit 91 emits a pulse to the driver amplifiers 101 and 103, which ultimately fire SCR 1, and dumps the energy stored in the integrating capacitor 94 to prepare it for a new charging sequence.

The driver amplifiers 101 and 102 also provide signals to two reset networks 111 and 112 which are basically flip-flops circuits. The output of network 111 is connected to an amplifier 113 and a diode 114 which is connected between the resistor 93 and the diode 115 at the output of the comparator amplifier 61. The output of network 112 is similarly connected to the integrating capacitor monitored by the second timer 92. When the controlled rectifier SCR 1 is conducting, the output of the reset network 111 is high and the output of the comparator amplifier 61 accumulates in the integrating capacitor 94. When the second timer 92 emits a pulse to turn SCR 2 on and commutate SCR 1 off, the first reset network 111 goes low and grounds the output of the first comparator amplifier 61. The amplifier output remains grounded until SCR 1 is fired by a pulse from the first timer 91 which is transmitted to the first reset circuit 111 and returns it to its high state. Reset network 112 operates in a corresponding manner, but goes high when SCR 2 is fired and goes low when SCR 1 is fired.

The reference ratio network 80 increases or decreases the reference signal of the first comparator amplifier 61 relative to that of the second comparator amplifier 61. By decreasing the reference signal of amplifier 61, SCR 1 will fire later in the positive half-cycle, thereby conducting for a shorter period of time and providing less cleaning action at the welding electrode. If the reference level is increased, SCR 1 will fire earlier in the positive half-cycle and provide more cleaning action. The balance control 82 allows the ratio of the integrated positive current to the integrated negative current to be adjusted from about 0.7 to 1.3. This range is limited in practice by the necessity of firing of an SCR only after the magnitude of the input potential is large enough to provide a rapid polarity reversal. The reference ratio network 80 is connected so that the reference signal to both comparator amplifiers increases as the control current increases. This allows the magnitude of the load current to be adjusted without changing the ratio of the positive to the negative currents.

Finally, the conduction control circuit includes a network 116 for inhibiting the firing of the controlled rectifiers. This enables the output of the power supply to be cut off in response to a remote switch, the loss of cooling air, or various other conditions.

Figure 4:
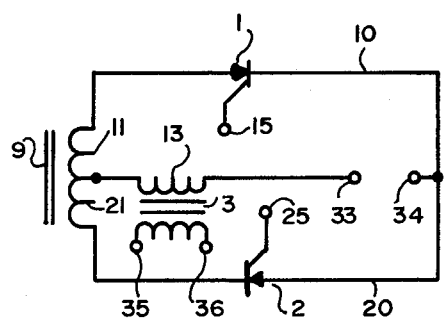
FIG. 4 is a schematic diagram of an alternative power circuit according to the present invention.

An alternative embodiment of the invention is shown in FIG. 4. The power circuit of this embodiment includes an input transformer 3 with primary terminals 35 and 36 and one secondary winding 13, one end of which is connected to the center tap of a choke with windings 11 and 21, and core 9. The other end of secondary winding 13 is connected to a load terminal 33. The ends of the choke are connected to the anode of SCR 1 and to the cathode of SCR 2. The opposite electrodes of SCR 1 and SCR 2 are connected to a load terminal 34. The conduction control circuit of FIG. 2 is used to provide pulses to the gates 15 and 25 of SCR 1 and SCR 2, respectively. The power circuit of FIG. 4 requires only one transformer secondary 13; however, because the two current paths 10 and 20 are not connected to provide a direct current output, this embodiment is suitable only where an alternating current output is sufficient.

In the power supply of FIG. 1, the load current is monitored by a shunt 5 connected to the output terminal 34. The signal appears across terminals 31 and 32 which are input terminals for the conduction control circuit of FIG. 2. If rectification occurs in a welding arc between electrode 45 and workpiece 46, a current circulates around a loop comprising SCR 1, SCR 2, secondary windings 13 and 23, and inductors 11 and 21. The magnitude of this circulating current is approximately one-half of the desired load current, but this circulating current bypasses the load and the shunt 5. Thus, the conduction control circuit sees a very low signal and seeks to alter the firing of the SCR's to restore the desired load current. When the arc is eventually re-established, the actual load current is initially much greater than desired. This results in undesirable welds.

Figure 5:
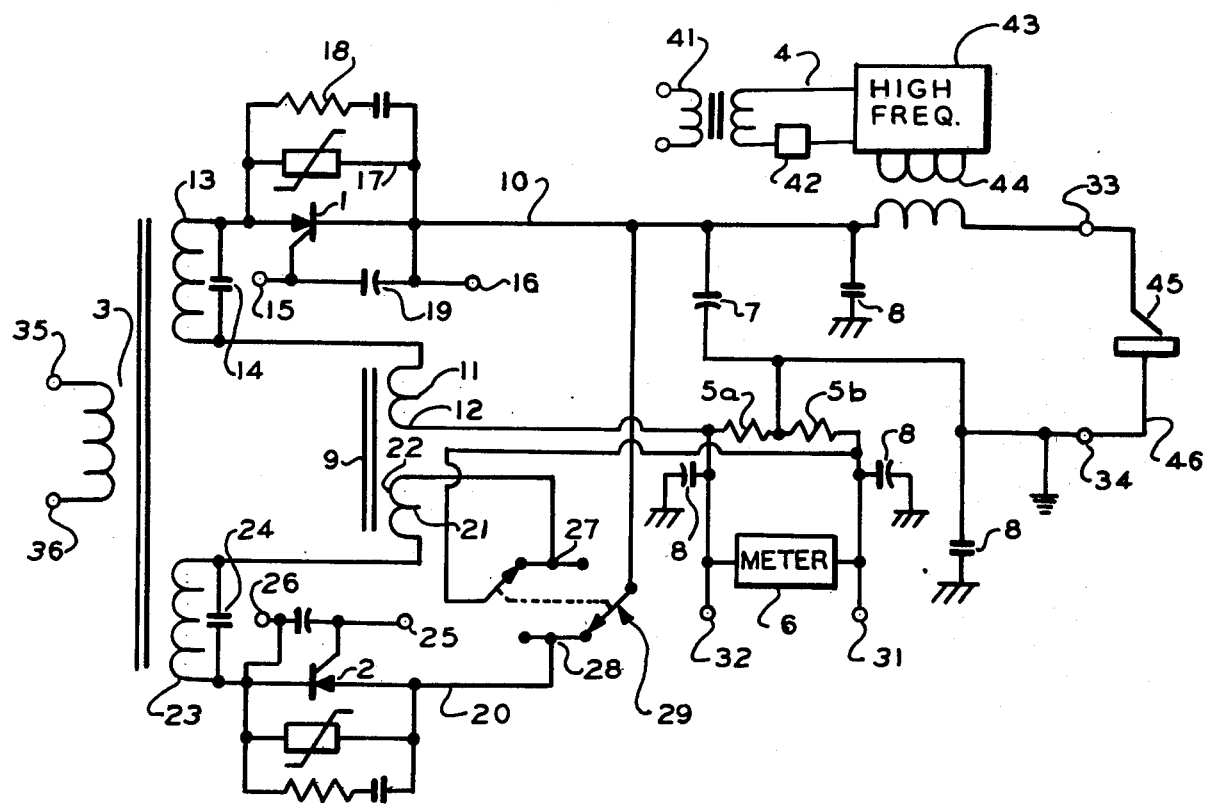
FIG. 5 is a schematic diagram of another power supply according to the present invention.

This problem is alleviated in a power supply according to FIG. 5. Most of this circuit is the same as FIG. 1, and corresponding reference numbers are used. The principal difference is the replacement of the single shunt 5 with two equal shunts 5a and 5b connected in series between terminals 31 and 32. Output terminal 34 is connected to a point between the two shunts. Terminal 31 is connected to one of the center terminals of switch 29, and terminal 32 is connected to end 12 of inductor 11.

When switch 29 is positioned as shown in FIG. 5, the normal output of the power supply is an alternating current. Shunt 5a is in series with inductor 11 and SCA 1, and shunt 5b is in series with inductor 21 and SCR 2. The entire load current flows through each shunt on alternating half-cycles and provides the normal signal for the conduction control circuit. During rectification, a circulating current of approximately one-half the magnitude of the normal load current flows through each shunt. Since the conduction control circuit sees the total signal across the two shunts, it sees the same signal as during normal operation. Thus, there is no tendency for the conduction control circuit to attempt to alter the firing of the SCR's and thus the load current has its normal magnitude when the rectification ceases and normal welding resumes.

When switch 29 is placed in the other position (not shown in FIG. 5), the output of the power supply is a direct current. The entire load current flows through each shunt on alternating half-cycles and provides the normal signal for the conduction control circuit.

The present invention has been shown and described in terms of specific embodiments. It is, of course, possible to change specific elements or the circuits without departing from the general principles and scope of the invention. For example, it is not necessary that the first and second secondary windings have the same number of turns or that they be excited by a single transformer primary winding.

What is claimed is:

1. A welding power supply operated by an alternating input potential, comprising:
   an input transformer having first and second secondary windings;
   first and second inductors which are magnetically tightly coupled and connected such that their induced fluxes are additive;
   first and second controlled rectifiers which conduct alternately;
   first and second current detectors;
   a first current path which includes a series connection of the first secondary winding, the first inductor, the first current detector and the first controlled rectifier;
   a means for monitoring the current in the first current detector and initiating conduction of the first controlled rectifier at a first selected phase of the input potential in response;
   a second current path which includes a series connection of the second secondary winding, the second inductor, the second current detector and the second controlled rectifier;
   a means for monitoring the current in the second current detector and initiating conduction of the second controlled rectifier at a second selected phase of the input potential in response; and a means for connecting the first and second current paths to a load.

2. The welding power supply of claim 1 wherein the first and second current paths are connected so that the load current is alternating current.

3. The welding power supply of claim 1 wherein the second current path includes a second secondary winding and the first and second current paths are connected so that the load current is direct current.

4. The welding power supply of claim 1 wherein the load connecting means includes a switch by which the load current can be selectively changed from alternating current to direct current.

5. The welding power supply of claim 1 further comprising a means for comparing the currents in the first and second current detectors with a control current and for altering the load current in response.

6. The welding power supply according to claim 5 further comprising a means for integrating the output of the current comparing means over each conduction interval of the controlled rectifiers.

7. The welding power supply according to claim 6 further comprising means for adjusting the ratio of the integrated currents supplied to the load by the first and second controlled rectifiers.

8. The welding power supply of claim 7 wherein each current comparing means comprises a differential amplifier and variable feedback elements for increasing the response time of the differential amplifier as the load current increases.

9. The welding power supply according to claim 8 wherein each current comparing means further comprises variable feedback elements for decreasing the ac gain of the differential amplifier as the load current increases.

10. The welding power supply according to claim 9 wherein the second current path also includes a second secondary winding and the load connecting means includes a switch by which the load current can be selectively changed from alternating current to direct current.

11. The welding power supply of claim 10 further comprising a capacitor connected across each of the secondary windings.

12. A welding power supply operated by a single-phase alternating input potential, comprising;
an input transformer having two secondary windings;
two inductors which are magnetically tightly coupled and connected such that their induced fluxes are additive;
two controlled rectifiers which conduct alternately;
two current detectors;
two current paths each of which includes a series connection of one secondary winding, one inductor, one current detector and one controlled rectifier;
two terminals for connecting the two current paths to a load;
a switch by which the load current can be selectively changed from a direct current to an alternating current having a rectangular wave shape; and
a control circuit having two sections, one for initiating conduction of each of the controlled rectifiers, where each section includes:
two differential amplifiers for comparing the current in each current detector with a control current,
a network for integrating the output of each differential amplifier over each conduction interval of the corresponding controlled rectifier, and
a network for adjusting the ratio of the integrated currents supplied to the load by the first and second controlled rectifiers.

13. The welding power supply of claim 12 wherein each currant detector comprises a shunt connected in series with the respective current path.

14. The welding power supply of claim 5 wherein the first current detector includes a first shunt connected in series in the first current path, and the second current detector includes a second shunt connected in series in the second current path.

* * * * *